Jan. 13, 1959     C. R. BONNELL     2,868,023

TWO-AXIS RATE GYROS

Filed Jan. 28, 1955

INVENTOR.
CHARLES R. BONNELL

BY

ATTORNEY

United States Patent Office 2,868,023
Patented Jan. 13, 1959

2,868,023

TWO-AXIS RATE GYROS

Charles R. Bonnell, Columbia Heights, Minn., assignor to Minneapolis-Honeywell Regulator Company, Minneapolis, Minn., a corporation of Delaware Application January 28, 1955, Serial No. 484,636

13 Claims. (Cl. 74—5.6)

This invention pertains to two-axis rate gyros, and more specifically to a two-axis rate gyro of novel construction which results in a compact, sensitive, and very accurate device. A two-axis rate gyro is defined as a gyro that responds to turning rates about two input axes perpendicular to one another as well as to the spin axis of the gyro. Just as a single-axis rate gyro responds to any force that has a component acting about the single input axis thereof, a two-axis rate gyro responds to any force which has a component acting about one of the two mutually perpendicular input axes. In a two-axis rate gyro a force might act exclusively about only one of the two input axes and not about the other input axes and vice versa or the force could have components acting about both input axes. Thus, in a broad sense, a two-axis rate gyro as so defined, responds to all forces which have a component acting about any axis which is perpendicular to the spin axis. It follows, therefore, that the only force a two-axis rate gyro won't respond to is a force parallel to the spin axis. Prior art two-axis rate gyros are known in the controls field, but in general they are all bulky and cumbersome pieces of apparatus.

It is an object of this invention to provide a new and improved two-axis rate gyro.

A further object of the invention is to provide a two-axis gyro having a spin motor supported on a flexible diaphragm that allows, in response to precessive forces acting on said spin motor, displacement of said spin motor about axes at right angles to the spin axis of the spin motor.

Other and more specific objects of the invention, including constructional details and the operation of two-axis rate gyros embodying my invention will be set forth more fully in and become apparent from a reading of the following specification and appended claims, in conjunction with the accompanying drawing in which:

Figure 1:
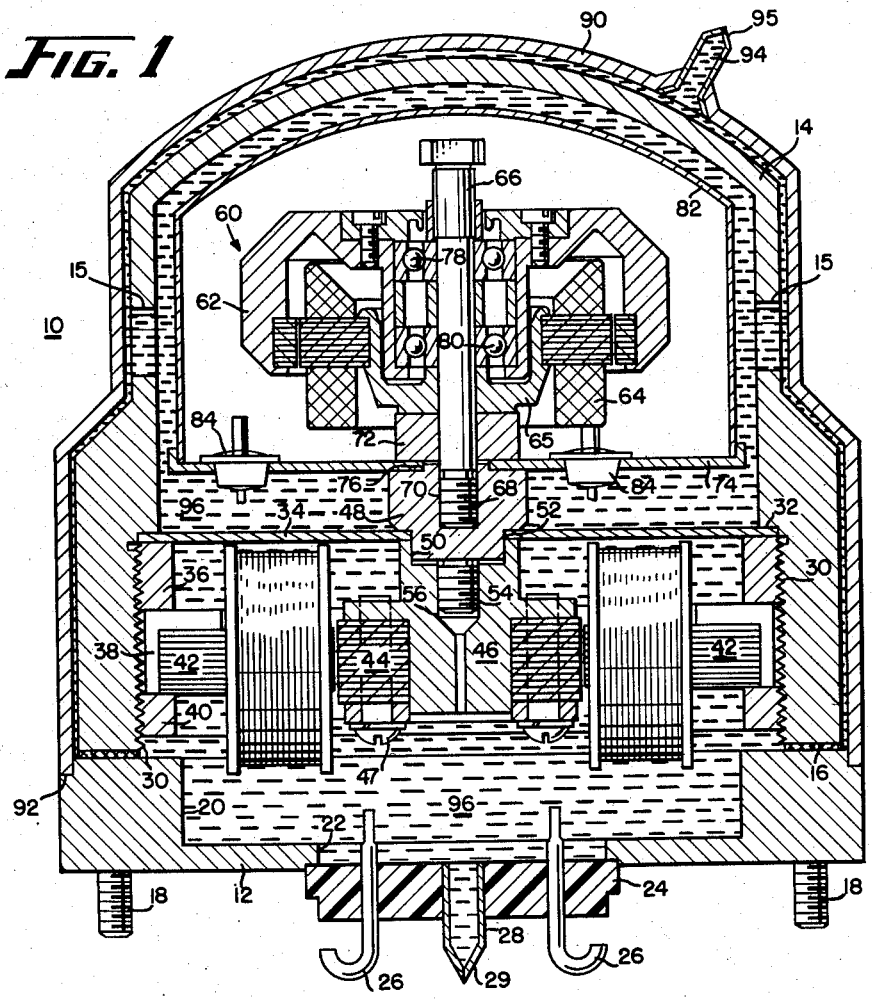
Figure 1 is a side view in cross section of a two-axis rate gyro embodying the teaching of my invention.

A two-axis rate gyro 10 is shown in Figure 1 as comprising a two-part base structure including a horizontal base member 12 and a cylindrical shell member 14. Members 12 and 14 are adapted to be secured together by suitable means such as screws (not shown) with a gasket 16 interposed between their abutting surfaces. A plurality of stud members 18 are secured on the bottom of base member 12 around the periphery thereof so as to provide a means of attaching the device to a support (not shown). Base member 12 has a circular recess 20 to provide the necessary clearance for the pickoff means to be later described in greater detail. Base 12 also has a central aperture 22 in which is disposed a terminal block 24 through which extend a plurality of terminals 26, in a hermetic fashion, used for connecting the components inside of the gyro to external circuitry (not shown). A fluid filling tube 28 is positioned centrally in terminal block 24. Shell 14 has its lower inner portion threaded as at 30 and has an inwardly extending shoulder 32 defined at the top part of the threaded portion 30. A flat circular diaphragm 34 made out of a resilient material such as brass, phosphor bronze, or the like is positioned against shoulder 32 of shell 14 and held in place therewith by a diaphragm retaining ring 36 having a threaded periphery cooperating with the threaded surface 30 of shell 14. A pickoff stator holder 38 is abutted against the lower surface of retaining ring 36 and is held in place by a pickoff retaining ring 40 generally similar to retaining ring 36 in that its outer periphery is threaded to cooperate with the threaded surface 30 of shell 14. Pickoff holder 38 holds the stator portion 42 of the differential transformer type of pickoff shown schematically in Figure 2. The stator 42 comprises the stationary portion of the pickoff while an armature member 44 constitutes the movable part of the pickoff. Armature 44 is secured to the central portion of diaphragm 34 by being secured to an armature holder 46 by suitable screw means 47. Armature holder 46 is clamped to diaphragm 34 by a cylindrical spacer member 48 which is positioned on the opposite side of diaphragm 34 from armature holder 46 and which has a portion 50 of reduced diameter that extends through and cooperates snugly with a suitable central aperture 52 in diaphragm 34 and a further reduced portion 54 with suitable threads thereon which cooperate with similar threads in a recess 56 in armature holder 46. Armature 44, mounted on armature holder 46, is thus firmly secured to diaphragm 34. Also mounted on spacer member 48, and thus on diaphragm 34, on the opposite side thereof from armature 44, is a gyro spin motor including a rotor member 62 and a stator 64. Stator 64 is mounted on a frame 65 which in turn is pressed onto a central shaft 66 having a threaded lower end 68, threaded end 68 extending into a threaded recess 70 centrally located in the top portion of spacer 48. An upper spacer member 72 is preferably positioned between spacer 48 and frame member 65 of the stator 64 of the gyro 60. A circular plate member 74 having a central aperture 76 therein is positioned between spacer 48 and upper spacer 72 and is clamped therebetween when shaft member 66 is threaded into spacer 48. Shaft 66 thus keeps frame 65 of stator 64, top spacer 72, plate member 74, and spacer 48 all in tight abutting relationship with the net result being that spin motor 60 is supported by diaphragm 34. Suitable bearing means 78 and 80 on shaft 66 rotatably support rotor member 62 with respect to stator 64. The entire spin motor 60 is enclosed in a fluid tight housing, the bottom part of which is previously mentioned plate member 74, and the top of which is a cup-shaped cover member 82, members 82 and 74 being secured together at their abutting surfaces by soldering or the like. Terminal means 84 are provided in the bottom part 74 of the spin motor housing to provide a means for electrically energizing stator member 64.

An outer cover 90 is provided for shell 14 and fits at its lower portion as shown into a cooperating shoulder 92 in base member 12, being secured thereto by suitable means such as soldering or the like. A tube member 94 is provided in the top portion of cover member 90 for liquid filling purposes.

A fluid 96 of a suitable kind and viscosity is used to fill all void spaces within gyro 10. The spaces are filled through tubes 28 and 94 which are then pinched off as at 29 and 95, respectively, after the filling operation has been completed. Fluid 96 is disposed between outer cover 90 and shell 14 as well as inside shell 14, passing through apertures 15 in shell 14 provided for this purpose. Since the housing for spin motor 60 is fluid tight, its displacement in fluid 96 exerts a buoyant effect on the spin motor-diaphragm-armature assembly. The design of these components is preferably that wherein the unfloated mass or the mass responsive to lateral acceleration, above the diaphragm 34 equals the unfloated mass or the mass responsive to lateral accelerations below the diaphragm. This gives the structure the advantage of being immune to lateral accelerations. This, of course presumes that the effective moment arms of the masses are equal. If the moment arms are not equal, then the masses must be correspondingly proportional. Stated otherwise, lateral accelerations will not cause flexing of diaphragm 34 so as to develop false signals in the pickoff.

Figure 2:
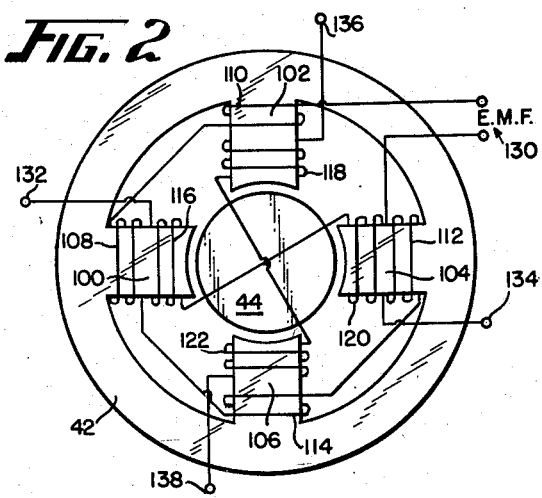
Figure 2 is a plan view, partially schematic, of the pickoff device used in the apparatus shown in Figure 1.

Referring to Figure 2, it is seen that the stator member 42 comprises a plurality of poles 100, 102, 104 and 106. Primary windings 108, 110, 112 and 114 as well as secondary windings 116, 118, 120 and 122 are wound respectively on said poles and are schematically shown. The primary windings are connected serially as shown to a source of suitable electromotive force 130 and secondary windings 116 and 120 are connected serially to define a first output winding having terminals 132 and 134 while secondary windings 118 and 122 define a second output winding having a second set of output terminals 136 and 138. It will be appreciated that normally armature member 44 is centrally located with respect to the inwardly extending pole faces of the pole members, and while so located equal voltages are induced in the various secondary windings. Under such conditions no output voltage is developed in the output terminals but as armature 44 is displaced either vertically or horizontally as shown in Figure 2 or any combination thereof output voltages are developed in the secondary windings according to the amount and direction of displacement.

Operation

In use, spin motor 60 will have its stator member 64 energized so as to cause rotation of rotor member 62. Diaphragm 34 supports spin motor 60 and resiliently centers rotor 44 of the pickoff between the various poles of the stator member 42. Fluid 96 damps any accelerations imparted to the device that are parallel to the spin axis of spin motor 60. Any lateral accelerations imparted to the device are transmitted to diaphragm 34 and, since it is rigid in this direction, they are not transmitted to the pickoff device 44. Further, since the effective unfloated mass above diaphragm 34 is equal to the effective unfloated mass below the diaphragm 34, these lateral accelerations will impart no turning moment about the diaphragm 34. However, any rotation of gyro 10 about axes that are perpendicular to the spin axis of rotor 62 will cause the usual precessive forces to act on spin motor 60. These precessive forces will result in diaphragm 34 being flexed slightly, with armature member 44 of the pickoff being displaced accordingly with respect to stator 42 and hence developing a signal in the output or secondary windings proportional to said displacement and to the direction of displacement. It will be appreciated that gyro 10 responds to all forces having components acting about the two input axes which are at right angles with one another and with the gyro spin axis and hence is a two-axis rate gyro as defined above. After the force which caused the precession is removed, the resilient diaphragm 34 will serve to recenter the rotor 44 with respect to stator 42 of the pickoff so that zero signal output will result therefrom.

Figure 3:
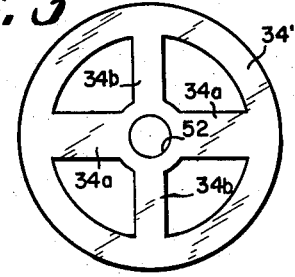
Figure 3 is a plan view of a modified diaphragm that may be used instead of the solid diaphragm shown in Figure 1.

Figure 3 shows an alternate form of diaphragm from that shown in Figure 1. Here instead of a solid diaphragm, a diaphragm 34' is provided with spoke members 34a and 34b depending away from the center thereof at right angles to one another. As shown, the cross sectional areas of spokes 34a extending in one direction have a greater cross sectional area than that of the spokes 34b so as to give different rates of response for the two axes of displacement.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. A rate gyro of the class described comprising: a spin motor including a rotor member having a spin axis; a base; pickoff means having a fixed part attached to said base and a movable part attached to said spin motor; and flexible diaphragm means mounted on said base and attached to said spin motor so as to support said spin motor for displacement about axes at right angles to said spin axis.

2. A rate gyro of the class described comprising: a spin motor having rotor means having a spin axis; a base; flexible diaphragm means on said base; and means mounting said rotor means on said diaphragm, said diaphragm allowing displacement of said rotor means about axes at right angles to said spin axis.

3. A two-axis rate gyro of the class described comprising: a spin motor including a rotor member and spinning means for said rotor; a base; electromagnetic pickoff means having a stator member attached to said base and an armature member connected to said spin motor; and resilient diaphragm means mounted on said base and attached to said spin motor so as to resiliently support said spin motor for displacement about two axes at right angles to each other.

4. A two-axis rate gyro of the class described comprising; a spin motor having a rotor and spinning means therefor; a base; a resilient circular diaphragm secured at its periphery to said base; and means mounting said rotor to the center of said diaphragm, said diaphragm allowing displacement of said rotor about two axes at right angles to each other and to the spin axis of said spin motor.

5. A two-axis rate gyro of the class described comprising: a base; a flexible diaphragm secured at its periphery to said base; a hollow sealed housing mounted on said diaphragm on one side thereof; a spin motor positioned inside said housing and including a rotor and spinning means therefor; pickoff means comprising a stationary portion secured to said base and a movable portion mounted on said diaphragm on the other side thereof; means on said base for enclosing said diaphragm, said housing, and said pickoff means; and liquid means disposed within said enclosing means so that the unfloated mass attached to said one side of said diaphragm is equal to the unfloated mass attached to said other side of said diaphragm, said flexible diaphragm permitting displacement of said housing about two axes at right angles to each other.

6. A two-axis rate gyro of the class described comprising: a base; a resilient diaphragm secured to said base; a hollow sealed housing mounted on said diaphragm on one side thereof; a spin motor positioned inside said housing and including a rotor and spinning means therefor; pickoff means comprising a first portion secured to said base and a second portion mounted on said diaphragm on the other side thereof; means enclosing said diaphragm, said housing, and said pickoff means; and liquid means disposed within said enclosing means, the unfloated mass attached to said one side of said diaphragm being equal to the unfloated mass attached to said other side of said diaphragm.

7. A two-axis rate gyro of the class described comprising: a base; a flat resilient diaphragm secured at its periphery to said base; a spin motor including a rotor and spinning means therefor mounted on said diaphragm on one side thereof; pickoff means comprising a first portion secured to said base and a second portion mounted on said diaphragm on the other side thereof; means enclosing said diaphragm, said spin motor, and said pickoff means; and liquid means disposed within said enclosing means and exerting buoyant effects on said spin motor and said pickoff means so that the unfloated mass attached to said one side of said diaphragm is equal to the unfloated mass attached to said other side of said diaphragm, said flexible diaphragm permitting displacement of said housing about two axes at right angles to each other.

8. A two-axis rate gyro of the class described comprising: a spin motor having a rotor and spinning means therefor; a base; a flat resilient diaphragm having a continuous periphery and a center portion and a plurality of spoke members connecting said periphery and said center section, said diaphragm being secured at its periphery to said base and said spin motor being secured to the center of said diaphragm, and pickoff means having a fixed part attached to said base and a movable part attached to the center of said diaphragm, said diaphragm resiliently supporting said spin motor and said movable pickoff part for displacement about two axes at right angles to each other and to the spin axis of said spin motor.

9. A two-axis rate gyro of the class described comprising: a spin motor having a rotor and spinning means therefor; a base; a flat circular resilient diaphragm having a continuous periphery and a center portion and a plurality of spoke members connecting said periphery and said center section, said diaphragm being secured at its periphery to said base and said spin motor being secured to the center of said diaphragm; and pickoff means having a fixed part attached to said base and a movable part attached to said diaphragm, said diaphragm resiliently supporting said spin motor and said movable pickoff part for displacement about two axes at right angles to each other and to the spin axis of said spin motor.

10. A two-axis rate gyro of the class described comprising: a spin motor having a rotor and spinning means therefor; a base; a resilient diaphragm having a continuous periphery, a center portion and four equally spaced spoke members connecting said periphery and said center section, said diaphragm being secured at its periphery to said base and said spin motor being secured to the center of said diaphragm; and pickoff means having a fixed part attached to said base and a movable part attached to said diaphragm, said diaphragm resiliently supporting said spin motor and said movable pickoff part for displacement about two axes at right angles to each other and to the spin axis of said spin motor.

11. Apparatus of the class described in claim 10 further characterized by two oppositely disposed ones of said spokes having a different cross-sectional area than the other of said spokes so that said diaphragm will offer more resistance to displacement of said spin motor and said movable pickoff part about one of said axes than the other of said axes.

12. A rate gyro of the class described comprising: a spin motor including a rotor having a spin axis; a base; flexible diaphragm means on said base; and means mounting said rotor on said diaphragm, said diaphragm having a plurality of spokes allowing displacement of said rotor about axes at right angles to said spin axis.

13. Apparatus of the class described in claim 12 further characterized by some of said spokes having a greater cross-sectional area than the other of said spokes.

References Cited in the file of this patent

UNITED STATES PATENTS

| | | |
|---|---|---|
| 2,353,150 | Dietz | July 11, 1944 |
| 2,677,194 | Bishop | May 4, 1954 |
| 2,719,291 | Wing | Sept. 27, 1955 |
| 2,746,301 | Henderson | May 22, 1956 |

FOREIGN PATENTS

| | | |
|---|---|---|
| 592,099 | Germany | Feb. 1, 1934 |